United States Patent [19]

Wolfers et al.

[11] 4,219,626

[45] Aug. 26, 1980

[54] ACCELERATORS FOR RADICAL POLYMERIZATION REACTIONS WITH INITIATORS FREE FROM PEROXIDE GROUPS

[75] Inventors: Heinrich Wolfers, Rheurdt; Hans J. Rosenkranz, Krefeld, both of Fed. Rep. of Germany

[73] Assignee: Bayer Aktiengesellschaft, Leverkusen, Fed. Rep. of Germany

[21] Appl. No.: 939,342

[22] Filed: Sep. 5, 1978

Related U.S. Application Data

[63] Continuation-in-part of Ser. No. 845,564, Oct. 26, 1977, abandoned.

[30] Foreign Application Priority Data

Oct. 30, 1976 [DE] Fed. Rep. of Germany ....... 2650173

[51] Int. Cl.$^2$ ...................... C08F 10/00; C08F 20/06; C08F 20/10; C08L 67/06

[52] U.S. Cl. ...................... 525/23; 525/24; 525/25; 525/26; 525/49; 526/204; 526/205; 526/209; 526/210; 526/211; 526/215; 526/217; 526/220; 526/323.1

[58] Field of Search ................. 526/89, 209, 210, 205, 526/204, 211, 217, 215, 220; 525/23, 24, 25, 26, 49

[56] References Cited

U.S. PATENT DOCUMENTS

| | | | |
|---|---|---|---|
| 2,478,066 | 8/1949 | van Peski | 526/220 |
| 2,647,878 | 8/1953 | Lee | 526/204 |
| 3,066,115 | 11/1962 | Smith et al. | 526/89 |
| 3,278,502 | 10/1966 | Huyser et al. | 526/209 |
| 3,313,863 | 4/1967 | Schnell et al. | 526/209 |
| 3,313,864 | 4/1967 | Rudolph et al. | |
| 3,378,533 | 4/1968 | Schnell et al. | 526/209 |

Primary Examiner—Harry Wong, Jr.
Attorney, Agent, or Firm—Connolly and Hutz

[57] ABSTRACT

Amines, amides and amidines work as accelerators for polymerization reactions with initiators of the 1.2-diphenyl ethane type.

3 Claims, No Drawings

ACCELERATORS FOR RADICAL POLYMERIZATION REACTIONS WITH INITIATORS FREE FROM PEROXIDE GROUPS

This application is a continuation-in-part application or our application Ser. No. 845 564, filed Oct. 26, 1977, now abandoned.

This invention relates to the use of amines, amides and amidines which do not decompose to radicals at temperatures below 250° C. and consequently are per se not suitable for initiating radical polymerization reactions, as accelerators for radically initiable polymerization reactions with peroxide-group-free thermolabile initiators of the 1,2-diphenyl ethane type.

By the expression "do not decompose to radicals," we understand that a 1% by weight solution of the accelerator in diphenyl ether does not contain more than 5% by weight radicals, based on the amount of accelerator, determined by ESR spectroscopy.

German Auslegeschrift No. 1,216,877, German Offenlegungsschriften Nos. 2,131,623; 2,164,482; 2,444,252, 2,545,451, 2,632,294 and U.S. Pat. No. 3,896,099 describe 1,2-substituted 1,2-diphenyl ethanes which are suitable for use as initiators for radically initiable polymerization reactions.

In contrast to the known peroxide catalysts, they are completely safe to handle because they do not show any tendency towards spontaneous or catalyzed explosive decomposition. The hardening of radically polymerizable substances can be easily and safely controlled in the presence of these initiators by temperature regulation.

One disadvantage of these peroxide-group-free initiators is that those which are readily obtainable only become active at relatively high temperatures, whereas, those which decompose into radicals at relatively low temperatures are relatively difficult to obtain and, for this reason, are also very expensive.

It has now surprisingly been found that amines, amides and amidines greatly accelerate radical polymerization reactions initiated by thermolabile 1,2-disubstituted 1,2-diphenyl ethane derivatives.

It is known that the decomposition of peroxides is accelerated by amines. Investigations into the mechanism of these reactions have shown that the catalyzing effect is produced by a nucleophilic attack by the amines on the peroxide group (D. Swern, Organic Peroxides, Vol. II, Wiley Interscience N.Y. 1971, pages 74 and 870). For this reason, any acceleration of the decomposition process by amines is much more noticeable in the case of peroxide groups low in electrons than in the case of peroxide groups rich in electrons. Accordingly, acyl peroxides are decomposed by amine catalysis at temperatures very far below their normal decomposition temperature (this system is used on a commercial scale for the so-called cold hardening of polymerizable unsaturated compounds and mixtures), whereas the decomposition of dialkyl peroxides is by far less influenced by amines.

For these reasons, it could not be expected that the polymerization-initiating activity of initiators free from peroxide groups, which act by the homolytic cleavage of a carbon-carbon single bond, would be influenced by the addition of nitrogen compounds.

The present invention relates to the use of amines, amidines and amidines which do not decompose to radicals at temperatures below 250° C., as accelerators for radically initiable polymerization reactions with peroxide-group-free thermolabile initiators of the 1,2-diphenyl ethane type.

Amines, amides and amidines suitable for use in accordance with the invention are, for example, acyclic aliphatic, cyclic aliphatic, aromatic and aliphatic-aromatic primary, secondary and tertiary amines, cyclic aliphatic secondary and tertiary amines, in which case the ring may optionally contain a carbon-carbon double bond or may have a second hetero atom (e.g. oxygen, sulphur or nitrogen) incorporated therein, with the provision that said amine contains no more than 24 carbon atoms, aliphatic, aromatic and aliphatic-aromatic primary, secondary and tertiary amides, cyclic secondary and tertiary amides, aliphatic aromatic and aliphatic-aromatic amidines.

Preferred amines, amides and amidines suitable for use in accordance with the invention are compounds corresponding to the formula:

$$R^1NR^2R^3 \qquad (I)$$

in which $R^1$ and $R^2$ represent a hydrogen atom, an aryl radical with 6 to 24 carbon atoms, an araliphatic radical with 7 to 10 carbon atoms, an alkyl radical with 1 to 20 carbon atoms, or an cycloalkyl radical with 4 to 10, preferably 5 or 6, carbon atoms, and $R^3$ represents the substituents as listed for $R^1$ and $R^2$, but hydrogen excepted.

Particularly preferred substituents $R^1$ and $R^2$ stand for hydrogen, alkyl radicals having 2 to 6 carbon atoms, cycloalkyl radicals having 5 to 6 carbon atoms, araliphatic radicals having 7 to 10 carbon atoms and phenyl; particularly preferred substituents $R^3$ represent alkyl radicals having 2 to 6 carbon atoms, cycloalkyl radicals having 5 to 6 carbon atoms, aryl radicals having 6 to 10 carbon atoms, preferably a phenyl radical;

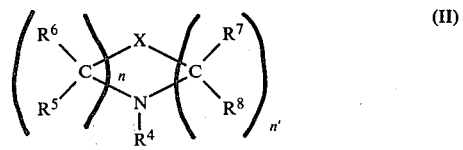

(II)

in which
X represents O, S, N—$R^4$ or

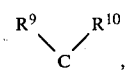

and $R^4$ represents a hydrogen atom, an alkyl radical with 1 to 4 carbon atoms, a cyclohexyl radical or an optionally substituted phenyl radical,
$R^5$ to $R^{10}$ represent an alkyl radical with 1 to 3 carbon atoms, or an aryl radical with 6 to 10 carbon atoms, preferably a hydrogen atom,
n and n' are integers from 1 to 4;

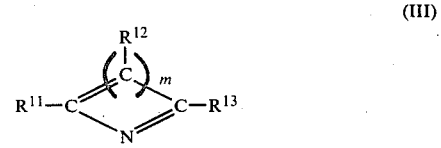

(III)

in which $R^{11}$ to $R^{13}$ represent a hydrogen atom, an alkyl radical with 1 to 3 carbon atoms or an aryl radical with 6 to 10 carbon atoms and n represents integers from 1 to 4;

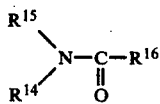

in which

R$^{14}$ represents a hydrogen atom, an alkyl radical with 1 to 6 carbon atoms or an aryl radical with 6 to 10 carbon atoms, R$^{15}$ represents an alkyl radical with 1 to 4 carbon atoms or an aryl radical with 6 to 10 carbon atoms, R$^{16}$ represents a hydrogen atom, an alkyl radical with 1 to 4 carbon atoms, an aryl radical with 6 to 10 carbon atoms, NR$^{14}$R$^{15}$ or OR$^{15}$;

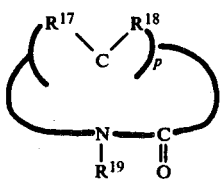

in which

R$^{17}$ to R$^{19}$ represent a hydrogen atom, an alkyl radical with 1 to 4 carbon atoms, a cyclohexyl radical or an aryl radical with 6 to 10 carbon atoms, and p is an integer from 2 to 4;

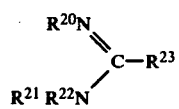

in which

R$^{20}$ to R$^{22}$ represent a hydrogen atom, an alkyl radical with 1 to 6 carbon atoms or an aryl radical with 6 to 10 carbon atoms, and R$^{23}$ represents the radicals mentioned in respect of R$^{20}$ or NR$^{20}$R$^{21}$.

(a) Preferred amine accelerators according to the invention are dimethyl amine, trimethyl amine, ethyl amine, diethyl amine, triethyl amine, n-propyl amine, di-n-propyl amine, tri-n-propyl amine, isopropyl amine, diisopropyl amine, triisopropyl amine, n-butyl amine, isobutyl amine, t-butyl amine, di-n-butyl amine, diisobutyl amine, tri-isobutyl amine, pentyl amine, isopentyl amine, diisopentyl amine, hexyl amine, octyl amine, dodecyl amine, lauryl amine, stearyl amine, aminoethanol, diethanol amine, triethanol amine, aminohexanol, ethoxy aminoethane, dimethyl-(2-chloroethyl) amine, 2-ethylhexyl amine, bis-(2-chloroethyl) amine, 2-ethylhexyl amine, bis-(2-ethylhexyl) amine, N-methyl stearylamine, dialkyl amines, ethylene diamine, N.N'-dimethyl ethylene diamine, tetramethyl ethylene diamine, diethylene triamine, permethyl diethylene triamine, triethylene tetramine, tetraethylene pentamine, 1.2-diaminopropane, di-propylene triamine, tripropylene tetramine, 1.4-diamino butane, 1.6-diamino hexane, 4-amino-1-diethyl aminopentane, 2.5-diamino-2.5-dimethyl hexane, trimethyl hexamethylene diamine, N.N-dimethyl aminoethanol, 2-(2-diethylamino ethoxy) ethanol, bis-(2-hydroxyethyl)-oleyl amine, tris-[2-(2-hydroxyethoxy)-ethyl]amine, 3-amino-1-propanol, methyl-(3-aminopropyl)ether, ethyl-(3-aminopropyl)ether, 1.4-butane-diol-bis(3-aminopropyl ether), 3-dimethylamino-1-propanol, 1-amino-2-propanol, 1-diethylamino-2-propanol, diisopropanol amine, methyl-bis-(2-hydroxypropyl)-amine, tris-(2-hydroxypropyl) amine, 4-amino-2-butanol, 2-amino-2-methyl-propanol, 2-amino-2-methyl-propanediol, 2-amino-2-hydroxymethylpropanediol, 5-diethylamino-2-pentanone, 3-methylaminopropionic acid nitrile, 6-aminohexanoic acid, 11-aminoundecanoic acid, 6-aminohexanoic acid ethyl ester, 11-aminohexanoic acid isopropyl ester, cyclohexyl amine, N-methylcyclohexyl amine, N.N-dimethylcyclohexyl amine, dicyclohexyl amine, N-ethylcyclohexyl amine, N-(2-hydroxyethyl)-cyclohexyl amine, N.N-bis-(2-hydroxyethyl)-cyclohexyl amine, N-(3-aminopropyl)-cyclohexyl amine, aminomethyl cyclohexane, hexahydro toluidine, hexahydro benzylamine, aniline, N-methyl aniline, N.N-dimethyl aniline, N.N-diethyl aniline, N.N-di-propyl aniline, isobutyl aniline, toluidines, diphenyl amine, hydroxyethyl aniline, bis-(hydroxyethyl) aniline, chloro-aniline, aminophenols, aminobenzoic acids and their esters, benzyl amine, dibenzyl amine, tribenzyl amine, methyldibenzyl amine, α-phenylethyl amine, xylidine, diisopropyl aniline, dodecyl aniline, amino naphthalene, N-methyl aminonaphthalene, N.N-dimethyl aminonaphthalene, N.N-dibenzyl naphthalene, diamino cyclohexane, 4.4'-diamino-dicyclohexyl methane, diamino-dimethyl-dicyclohexyl methane, phenylene diamine, xylylene diamine, diamino biphenyl, naphthalene diamines, toluidines, benzidines, 2.2-bis-(aminophenyl)-propane, amino anisoles, amino-thiophenols, aminodiphenyl ethers, amino cresols, morpholine, N-methyl morpholine, N-phenyl morpholine, hydroxyethyl morpholine, N-methyl pyrrolidine, pyrrolidine, piperidine, hydroxyethyl piperidine, pyrrols, pyridines, chinolines, indoles, indolenines, carbazoles, pyrazoles, imidazoles, thiazoles, pyrimidines, chinoxalines, amino morpholine, dimorpholine ethane, [2.2.2]-diazabicyclo octane.

(b) Preferred amide accelerators according to the invention are pyrrolidone, N-methyl-pyrrolidone, N.N-dimethyl formamide, N.N-dimethyl acetamide, acetanilide, N.N-dimethyl urea, methyl thiourea, tetramethyl urea, tetraethyl urea, N.N-dimethyl benzamide, benzanilide, acetoacetic acid benzylamide, 4-amino formanilide, bis-acetylamino toluene, caprolactam.

(c) Preferred amidine accelerators according to the invention are guanidine, benzamidine, acetamidine, N-benzyl benzamidine, N.N'-dimethyl acetamidine.

Suitable peroxide-group-free initiators are the 1,2-substituted 1,2-diphenyl ethanes described, for example, in German Auslegeschrift No. 1,216,877, German Offenlegungsschriften Nos. 2,131,623; 2,164,482; 2,444,252 and 2,545,451 and in U.S. Pat. No. 3,896,099. Representatives of these initiators are, for example, acetophenone pinacol, benzpinacol, 3,4-diphenyl-3,4-dimethyl hexane, 1,2-dichlorotetraphenyl ethane, tetraphenyl succinic acid dinitrile and benzpinacol alkyl or silyl ether.

The accelerators used in accordance with the invention may be added to the systems to be polymerized in quantities of from 0.01 to 2.0% by weight and preferably in quantities of from 0.05 to 1.0% by weight, whilst the peroxide-group-free initiators may be added in quantities of from 0.05 to 2.0% by weight, based in both cases on the substrate to be polymerized, either individually or in admixture.

Mixtures of which 30 to 90 parts by weight consist of peroxide-group-free initiators, preferably benzpinacol, acetophenone pinacol and their alkyl and silyl ethers, and 70 to 10 parts by weight of a nitrogen-containing base such as, for example, piperidine, morpholine, diethanolamine or triethanolamine, pyridine, triethylamine, dodecylamine or N,N-dimethyl aniline, are particularly advantageous for the polymerization of radically polymerizable substrates.

The following are mentioned as substrates on which the compounds used in accordance with the invention have an accelerating effect:

A. Acrylic and methacrylic compounds

Acrylic and methacrylic acid;

Acrylic acid and methacrylic acid alkyl esters with 1 to 18 carbon atoms and preferably with 1 to 8 carbon atoms in the alcohol component such as, for example, methyl acrylate, ethyl acrylate, propyl acrylate, isopropyl acrylate, n-butyl acrylate, tert.-butyl acrylate, 2-ethylhexyl acrylate, stearyl acrylate and the corresponding methacrylic acid esters;

Acrylic acid and methacrylic acid cyclohexyl esters;

Esters of acrylic acid and methacrylic acid with dihydric, saturated aliphatic alcohols with 2 to 4 carbon atoms such as, for example, 2-hydroxyethyl acrylate, 2-hydroxypropyl acrylate, 4-hydroxybutyl acrylate and the corresponding methacrylic acid esters;

Crosslinking acrylic and methacrylic compounds such as, for example, acrylic and/or methacrylic acid allyl ester, methylene-bis-acrylamide, methylene-bis-methacrylamide, triacryloyl-perhydro-S-triazine, bis-acrylates and bis-methacrylates of glycols and polyglycols with 2 to 20 carbon atoms, such as ethylene glycol di(meth)acrylate, propylene glycol di(meth)acrylate, 1,4-butylene glycol di(meth)acrylate, tetraethylene glycol di(meth)acrylate, tris(meth)acrylates of triethanolamine, of trimethylol ethane, propane and hexane, and of glycerol;

Acrylic and methacrylic acid vinyl ester;

Acrylonitrile and methacrylonitrile;

Acrylamide and methacrylamide;

N-methylol ethers of acrylic acid and methacrylic acid amide corresponding to the general formula:

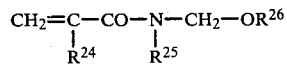

in which $R^{24}$ represents hydrogen or methyl, $R^{25}$ represents hydrogen, alkyl, aralkyl or aryl, and $R^{26}$ represents alkyl or cycloalkyl such as methyl, ethyl n-propyl, isopropyl, n-butyl, isobutyl cyclohexyl (cf. German Auslegeschrift No. 1,035,363; the N-methylol methyl ether of methacrylic acid amide is preferred); N,N-dialkyl-substituted acrylic and methacrylic acid amides; Primary, secondary and tertiary aminoalkyl esters of acrylic acid and methacrylic acid.

B. Polymerizable vinyl and vinylidene compounds

Ethylene;

Styrene; nucleus-chlorinated and -alkylated or -alkenylated styrenes, the alkyl groups containing from 1 to 4 carbon atoms, such as for example vinyl toluene, divinylbenzene, α-methyl styrene, tert.-butyl styrene or chlorostyrenes;

Vinyl esters of carboxylic acids with 2 to 6 carbon atoms such as vinyl acetate, vinyl propionate, succinic acid divinyl ester, vinyl pyridine, vinyl naphthalene or vinyl cyclohexane;

Vinyl ethers such as vinyl propyl ether and vinyl isobutyl ether;

Maleic acid anhydride, semiesters and diesters with 1 to 4 carbon atoms in the alcohol component, semiamides and diamides or cyclic imides, such as N-methyl maleic imide or N-cyclohexyl maleic imide; allyl compounds, such as allyl benzene, and allyl esters, such as allyl acetate, phthalic acid diallyl ester, isophthalic acid diallyl ester, maleic acid and fumaric acid diallyl ester, allyl carbonates, diallyl carbonates, diallyl phenyl carbonates, triallyl phosphate, triallyl cyanurate and isocyanurate;

isobutyl vinyl ether, 1,4-butane diol divinyl ether, ethylene glycol diallyl ether, pentaerythritol tetraallyl ether;

Vinyl pyrrolidone;

Vinyl chloride or vinylidene chloride.

C. Conjugated dienes

Such as butadiene, isoprene or chloroprene.

D. Unsaturated polyester resins

The polyester resins accelerated with the compounds used in accordance with the invention generally consist of 40 to 80% by weight of α,β-ethylenically unsaturated polyesters and of 60 to 20% by weight of vinyl or vinylidene compounds copolymerizable therewith.

α,β-Ethylenically unsaturated polyesters are the usual polycondensation products of at least one α,β-ethylenically unsaturated dicarboxylic acid with generally 4 or 5 carbon atoms or ester-forming derivatives thereof, optionally in admixture with up to 90 mole %, based on the unsaturated acid components, of at least one aliphatic saturated dicarboxylic acid with 4 to 10 carbon atoms or a cycloaliphatic dicarboxylic acid with 8 to 10 carbon atoms or ester-forming derivatives thereof with at least one polyhydroxy compound, especially a dihydroxy compound, containing from 2 to 8 carbon atoms, i.e. polyesters of the type described by J. Björksten et al in "Polyesters and their Applications" Reinhold Publishing Corp., New York, 1956.

Examples of preferred unsaturated dicarboxylic acids or their derivatives are maleic acid or maleic acid anhydride and fumaric acid. However, it is also possible to use, for example, mesaconic acid, citraconic acid, itaconic acid or chloromaleic acid. Examples of the aliphatic saturated dicarboxylic acids or cycloaliphatic dicarboxylic acids, or their derivatives, used in accordance with the invention are phthalic acid or phthalic acid anhyride, isophthalic acid, terephthalic acid, hexahydro or tetrahydrophthalic acid or their anhydrides, endomethylene tetrahydrophthalic acid or its anhydride, succinic acid or succinic acid anhydride and succinic acid esters and chlorides, adipic acid and sebacic acid. In order to produce substantially non-inflammable resins, it is possible for example, to use hexachloro-endomethylene tetrahydrophthalic acid (HET acid), tetrachlorophthalic acid or tetrabromophthalic acid. Preferred polyesters contain maleic acid residues of which up to 25 mole % may be replaced by phthalic acid or isophthalic acid residues. Preferred dihydric alcohols are ethylene glycol, 1,2-propane diol, 1,3-propane diol, diethylene glycol, dipropylene glycol, 1,3-butane diol, 1,4-butane diol, neopentyl glycol, 1,6-hexane diol, 2,2-bis(4-hydroxy cyclohexyl)-propane, bis-alkoxylated bisphenol A, perhydrobisphenol and others.

Further modifications are possible by incorporating up to 10 mole %, based on the alcohol or acid component, of monohydric, trihydric and tetrahydric alcohols containing 1 to 6 carbon atoms, such as methanol, ethanol, butanol, allyl alcohol, benzyl alcohol, cyclohexanol and tetrahydrofurfuryl alcohol, trimethylol propane, glycerol and pentaerythritol, and of mono-, di- and tri-allyl ethers and benzyl ethers of trihydric and polyhydric alcohols containing from 3 to 6 carbon atoms according to German Auslegeschrift No. 1,024,654, and by incorporating monobasic acids such as benzoic acid or long-chain unsaturated fatty acids such as oleic acid, linseed oil fatty acid and ricinene fatty acid.

The acid numbers of the polyesters are generally in the range of from 1 to 100 and preferably in the range of from 20 to 70, their OH-numbers are generally in the range of from 10 to 150 and preferably in the range of from 20 to 100 and their molecular weights, measured as number averages ($\overline{M}_n$), are generally in the range of from about 500 to 5000 and preferably in the range of from about 1000 to 3000 (as measured by vapour pressure osmometry in dioxane and acetone; in the case of differing values, the lower value is taken as the correct value).

Suitable vinyl and vinylidene compounds copolymerizable with the unsaturated polyesters are the substances mentioned above under B, preferably styrene.

The accelerators used in accordance with the invention are particularly suitable for use with unsaturated polyester resins.

In contrast to the cold-hardening initiator/accelerator systems of acyl peroxides and aromatic amines which can only be separately stored, the systems of peroxide-group-free initiator and accelerator used in accordance with the invention are distinguished by the fact that they may be used in the form of single-component systems without any danger of explosive decomposition or reduction in their polymerization-initiating activity. The polymerization-accelerating effect of the compounds used in accordance with the invention does not manifest itself until they are dissolved with the initiator in a radically polymerizing substance and heated to a minimum temperature dependent upon the structure of the initiator. Under these conditions, substrates containing peroxide-group-free initiators polymerize much more quickly in the presence of the accelerators used in accordance with the invention than is the case with corresponding accelerator-free comparison samples.

Another advantage is that, by varying the type of accelerators used in accordance with the invention and the quantities in which they are used, it is possible to regulate the polymerization times within wide limits at constant initiator concentration and reaction temperature without adversely affecting the quality of the hardened products.

Accordingly, by adding these accelerators, particularly in the mass production of radically hardened mouldings, it is possible to obtain considerably shorter cycle times or to reduce considerably the working temperatures for the same cycle times.

In the following Examples, the parts quoted represent parts by weight and the percentages percent by weight.

EXAMPLE 1

An unsaturated polyester resin produced from 11 parts of phthalic acid anhydride, 47 parts of maleic acid anhydride and 42 parts of 1,2-propylene glycol at a temperature of 200° C. (acid number 20, OH-number 30, viscosity at 20° C.: 1500 cP) is dissolved in styrene to form a 66% solution, stabilized with 0.01 part of hydroquinone and mixed with (a) 0.01 part of triethanolamine, (b) 0.1 part of triethanolamine, (c) 0.1 part of pyridine, (d) 0.1 part of dimethyl formamide, (e) - and 0.3 part of benzpinacol.

One hour after addition of the initiator, 20 g of a resin mixture are introduced into an 18 mm diameter test tube. An iron-Constantan thermocouple, which is connected to a temperature-time recorder, is immersed in the resin to a depth of 3 cm and the test tube filled to a level of 8 cm is placed in a thermostatically controlled oil bath after the recorder has been switched on. The hardening times $t_H$ (time taken to reach the peak temperature minus the time taken to exceed the 65° C. line) [mins] and the peak temperature $T_m$ [°C.] are determined in accordance with DIN 16 945.

The following values are obtained at the bath temperatures indicated:

| Test | Bath temp. °C. 90 | | 100 | | 110 | | 120 | |
|---|---|---|---|---|---|---|---|---|
| | $t_H$ | $T_m$ | $t_H$ | $T_m$ | $t_H$ | $T_m$ | $t_H$ | $T_m$ |
| a | 18.5 | 225 | 10.0 | 240 | 5.4 | >250 | 3.3 | >250 |
| b | 17.0 | 230 | 8.3 | 245 | 4.9 | >250 | 3.0 | >250 |
| c | 17.5 | 230 | 8.7 | 245 | 5.2 | >250 | 3.1 | >250 |
| d | 23.0 | 210 | 11.8 | 230 | 7.0 | 245 | 4.2 | 250 |
| e | — | — | 12.5 | 225 | 7.5 | 240 | 4.5 | 250 |

EXAMPLE 2

The procedure is as described in Example 1, except that the resin mixtures (a)-(e) are stored for 4 days at 50° C. before hardening. The measurements subsequently carried out did not reveal any changes in the peak temperatures and hardening times.

EXAMPLE 3

The following initiator systems are used in accordance with Example 1:

0.3 part
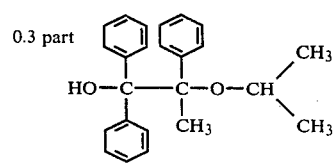
A

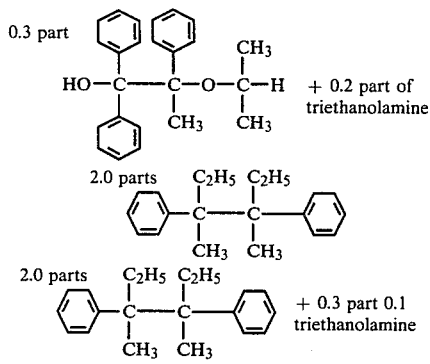

B: 0.3 part [structure] + 0.2 part of triethanolamine

C: 2.0 parts [structure]

D: 2.0 parts [structure] + 0.3 part 0.1 triethanolamine

The following hardening times $t_H$ (mins) and maximum temperatures $T_m$ (°C.) are obtained at the bath temperatures indicated:

| Initiator | Bath temp. °C. 130 | | 140 | | 150 | |
|---|---|---|---|---|---|---|
| | $t_H$ | $T_m$ | $t_H$ | $T_m$ | $t_H$ | $T_m$ |
| A | 9.8 | >250 | 5.4 | >250 | 3.6 | >250 |
| B | 6.5 | >250 | 4.0 | >250 | 2.8 | >250 |
| C | 11.2 | 240 | 6.9 | >250 | 4.7 | >250 |
| D | 9.6 | 245 | 5.8 | >250 | 4.1 | >250 |

EXAMPLE 4

100 parts of hexane diol bis-acrylate are mixed with the initiator systems E–H and triethanolamine (Test j)

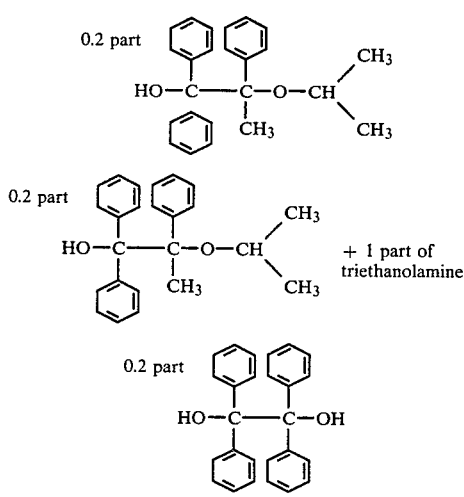

E: 0.2 part [structure]

F: 0.2 part [structure] + 1 part of triethanolamine

G: 0.2 part [structure]

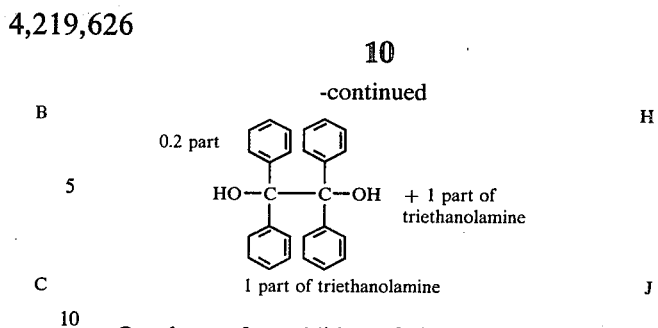

H: 0.2 part [structure] + 1 part of triethanolamine

J: 1 part of triethanolamine

One hour after addition of the initiator, 20 g of a mixture are introduced into an 18 mm diameter test tube. An iron-Constantan thermocouple which is connected to a temperature-time recorder is immersed to a depth of 3 cm in the resin and the test tube filled to a level of 8 cm is placed in a thermostatically controlled oil bath after the recorder has been switched on. The hardening time ($t_H$) is the period of time elapsing from the moment when the 50° C. line is exceeded to the moment the 200° C. line is reached. In addition, the peak temperature ($T_m$) was determined with the aid of the diagram.

The following values for $t_H$ (mins) and $T_m$ (° C.) are obtained at the bath temperatures indicated:

| Initiator | Bath temp. °C. 110 | | 120 | | 130 | | 140 | | 150 | |
|---|---|---|---|---|---|---|---|---|---|---|
| | $t_H$ | $T_m$ | $t_H$ | $T_m$ | $t_H$ | $T_m$ | $t_m$ | $T_m$ | $t_H$ | $T_m$ |
| E | | | | | >25 | — | 13.5 | >250 | 6.5 | >25 |
| F | | | 6.4 | >250 | 4.3 | >250 | 2.7 | >250 | 1.9 | >25 |
| G | >30 | | 11.5 | 230 | 4.5 | 240 | 2.6 | 245 | | |
| H | 2.9 | >250 | 2.4 | >250 | 2.0 | >250 | | | | |
| J | 9.6 | 130 | 7.0 | 170 | 5.7 | 180 | | | | |

We claim:
1. In the process of initiating radically initiatable polymerization reactions with peroxide-group-free thermolabile initiators of the 1,2-diphenyl ethane type, the improvement comprises accelerating said reactions by introducing into said reaction 0.01 to 2.0% by weight of an amine which does not decompose to radicals at temperatures below 250° C.; said amine being a compound selected from the group consisting of
(a) aromatic, acyclic and cyclic aliphatic, and aliphatic-aromatic primary, secondary and tertiary amines, or
(b) cyclic aliphatic secondary and tertiary amines containing a second hetero atom selected from oxygen, sulphur and nitrogen, with the provision that said amine contains no more than 24 carbon atoms.
2. The process according to claim 1 wherein said amine contains no more than 10 carbon atoms.
3. The process according to claim 1 wherein the accelerator is selected from the group consisting of: dimethyl amine, trimethyl amine, ethyl amine, diethyl amine, triethyl amine, n-propyl amine, di-n-propyl amine, tri-n-propyl amine, isopropyl amine, diisopropyl amine, triisopropyl amine, n-butyl amine, isobutyl amine, t-butyl amine, di-n-butyl amine, diisobutyl amine, tri-isobutyl amine, pentyl amine, isopentyl amine, diisopentyl amine, hexyl amine, octyl amine, dodecyl amine, lauryl amine, stearyl amine, aminoethanol, diethanol amine, triethanol amine, aminohexanol, ethoxy aminoethane, dimethyl-(2-chloroethyl) amine, 2-ethylhexyl amine, bis-(2-chloroethyl) amine, 2-ethylhexyl amine, bis-

(2-ethylhexyl) amine, N-methyl stearylamine, dialkyl amines, ethylene diamine, N.N'-dimethyl ethylene diamine, tetramethyl ethylene diamine, diethylene triamine, permethyl diethylene triamine, triethylene tetramine, tetraethylene pentamine, 1.2-diaminopropane, di-propylene triamine, tripropylene tetramine, 1.4-diamino butane, 1.6-diamino hexane, 4-amino-1-diethyl aminopentane, 2.5-diamino-2.5-dimethyl hexane, trimethyl hexamethylene diamine, N.N-dimethyl aminoethanol, 2-(2-diethylamino ethoxy) ethanol, bis-(2-hydroxyethyl)-oleyl amine, tris-[2-(2-hydroxy-ethoxy)-ethyl]amine, 3-amino-1-propanol, methyl-(3-aminopropyl)ether, ethyl-(3-aminopropyl)ether, 1.4-butane diol-bis(3-aminopropyl ether), 3-dimethylamino-1-propanol, 1-amino-2-propanol, 1-diethylamino-2-propanol, diisopropanol amine, methyl-bis-(2-hydroxypropyl)-amine, tris-(2-hydroxypropyl) amine, 4-amino-2-butanol, 2-amino-2-methylpropanol, 2-amino-2-methyl-propanediol, 2-amino-2-hydroxymethylpropanediol, 5-diethylamino-2-pentanone, 3-methylaminopropionic acid nitrile, 6-aminohexanoic acid, 11-aminoundecanoic acid, 6-aminohexanoic acid ethyl ester, 11-aminohexanoic acid isopropyl ester, cyclohexyl amine, N-methylcyclohexyl amine, N.N-dimethylcyclohexyl amine, dicyclohexyl amine, N-ethylcyclohexyl amine, N-(2-hydroxyethyl)-cyclohexyl amine, N.N-bis-(2-hydroxyethyl)-cyclohexyl amine, N-(3-aminopropyl)-cyclohexyl amine, aminomethyl cyclohexane, hexahydro toluidine, hexahydro benzylamine, aniline, N-methyl aniline, N.N-dimethyl aniline, N.N-diethyl aniline, N.N-dipropyl aniline, isobutyl aniline, toluidines, diphenyl amine, hydroxyethyl aniline, bis-(hydroxyethyl) aniline, chloro-aniline, aminophenols, aminobenzoic acids and their esters, benzyl amine, dibenzyl amine, tribenzyl amine, methyldibenzyl amine, α-phenylethyl amine, xylidine, diisopropyl aniline, dodecyl aniline, amino naphthalene, N-methyl aminonaphthalene, N.N-dimethyl aminonaphthalene, N.N-dibenzyl naphthalene, diamino cyclohexane, 4.4'-diamino-dicyclohexyl methane, diamino-dimethyl-dicyclohexyl methane, phenylene diamine, xylylene diamine, diamino biphenyl, naphthalene diamines, toluidines, benzidines, 2.2-bis-(aminophenyl)-propane, amino anisoles, amino-thiophenols, aminodiphenyl ethers, amino cresols, morpholine, N-methyl morpholine, N-phenyl morpholine, hydroxyethyl morpholine, N-methyl pyrrolidine, pyrrolidine, piperidine, hydroxyethyl piperidine, pyrrols, pyridines, chinolines, indoles, indolenines, carbazoles, pyrazoles, imidazoles, thiazoles, pyrimidines, chinoxalines, amino morpholine, dimorpholine ethane, [2,2,2]-diazabicyclo octane.

* * * * *